April 5, 1932.  G. KLINKENSTEIN  1,852,581
COATING COMPOSITION AND PROCESS OF MAKING SAME
Filed May 15, 1930
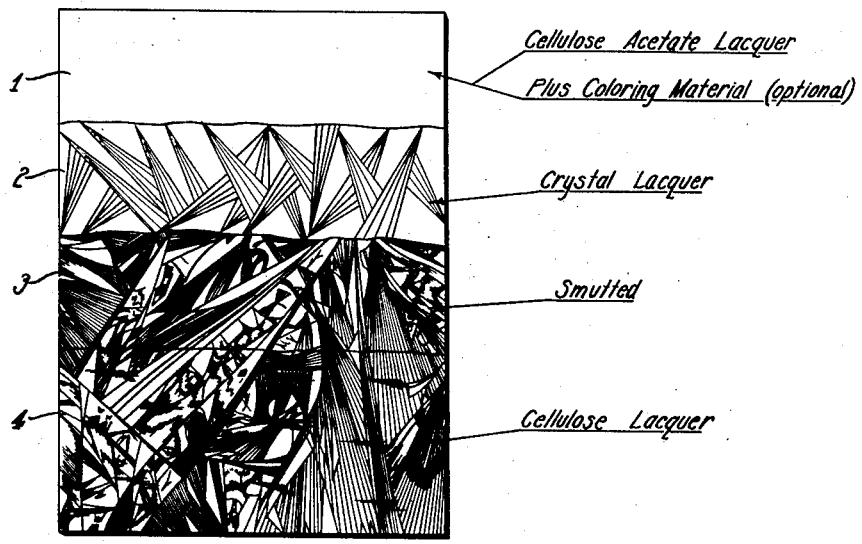
INVENTOR.
Gustave Klinkenstein
BY
George D. Richards
ATTORNEY.

Patented Apr. 5, 1932

1,852,581

UNITED STATES PATENT OFFICE

GUSTAVE KLINKENSTEIN, OF NEWARK, NEW JERSEY, ASSIGNOR TO MAAS & WALDSTEIN CO., OF NEWARK, NEW JERSEY, A CORPORATION OF NEW JERSEY

COATING COMPOSITION AND PROCESS OF MAKING SAME

Application filed May 15, 1930. Serial No. 452,588.

This invention relates, generally, to compositions for coating or covering surfaces of objects; and the invention has reference, more particularly, to the process of making a novel coating composition of the crystal type and to the composition produced by such process.

Heretofore, some use has been made of crystal lacquers for coating or covering surfaces, such as the surfaces of furniture and the like. These crystal lacquers comprise a suitable lacquer base with crystalline compounds dissolved within such base. Upon the drying of the lacquer, the crystalline compound contained therewithin is precipitated in crystalline form, giving the surface of the article to which it is applied, a pleasing appearance. However, such crystal lacquers, when dry, present a surface which is rough and uneven owing to the presence of fissures or cracks extending between adjacent crystals. Owing to this undesired roughness and also the tendency of the surface to become chipped or injured by abrasion, such crystal lacquers cannot be used for fine furniture or in other uses where a smooth finish is desired.

The principal object of the present invention is to provide a novel crystal coating composition and a process for making the same, which composition has a smooth lustrous finish without surface irregularities and which is adapted for use on the finest of furniture and the like.

Another object of the present invention lies in the provision of a novel coating composition of the crystal type which is adapted to be finished in any color combination desired, and in which any desired system or systems of crystal formation may be obtained.

A third object of the present invention is to provide a crystal coating composition and method of producing the same which enables the size of the crystals present in the composition to be varied at will, and which composition is highly stable and wear resistant, the said coating having means for protecting the crystal formations from direct abrasion.

Still another object of the present invention is to provide a novel coating composition of the above character which is equally applicable to all types of surfaces whether metal, wood or fibrous and etc.

Other objects of this invention, not at this time more particularly enumerated, will be clearly understood from the following detailed description of the same.

The invention is illustrated in the accompanying drawing, in which the single figure illustrates an article provided with the novel coating composition of the present invention, the said novel composition being illustrated with parts broken away to better show the formation thereof.

In accordance with the principles of the present invention, the novel composition is made up of a plurality of layers. These layers consist, initially, of a priming or sealer coat which is applied directly to the surface to be coated. This priming coat may be pigmented or may have a bronze powder intermixed therein, thereby causing the priming coat to have any desired color. Upon this priming coat is imposed a coat of crystal lacquer which, when dried, presents a surface which is divided into a plurality of crystalline formations, typical of crystal lacquers, the said crystalline formations being separated or defined by fissures running therebetween. This surface is then rubbed or smutted with a suitable colored material which, becoming lodged in the crystal fissures, acts to clearly define the crystal borders and enhance the beauty of the surface. One or more lacquer layers are then applied to the surface, the said layers being of a nature to dissolve off the higher portions of the crystals and to act as a body to fill up the fissures so as to thereby produce a final composition surface which is absolutely true and smooth, the said surface having a high gloss, especially if buffed.

Referring now to the drawing, the single figure illustrates an article provided with an illustrative example of the composition of this invention, the said composition being broken away in successive layers to illustrate the steps in the formation thereof. The priming or sealer coat 1 which is first applied to the article is preferably of cellulose acetate lacquer. This cellulose acetate lacquer may be applied in either clear transparent condition, as when applying the composition to wood should it be desired that the grain of the wood shall show through the composition, or this priming coat may be colored as by the use of a bronze powder or pigment mixed or ground into the cellulose acetate lacquer. As is well known to those skilled in the art, these bronze powders may be obtained in any color desired. This priming coat of cellulose acetate lacquer will dry in the open air in about an hour's time.

A coat of clear crystal lacquer 2 (such as that disclosed in German patent to Rieder #266,265, Oct. 20, 1913) is then applied upon the priming coat. As the clear crystal lacquer dries, the crystalline substance contained therein, such as naphthalene, salicylic acid or other suitable compound, reaches supersaturation due to the vaporization of solvents from the crystal lacquer coating. The crystalline substance thereupon crystallizes out in definite crystalline form. Further drying of the crystal lacquer results in the complete evaporation of solvents and in the solidification of the resins, cellulose ester and plasticizers used in the lacquer and causes the crystalline substance to assume a definite fixed arrangement of crystal formation. Any type of crystal formation may be obtained and the crystal formation may be varied at will by use of suitable organic solvents forming a constitutent part of the crystal lacquer vehicle. It is possible to obtain various crystalline systems from a single crystalline substance by suitably varying the constituent solvents. Also, by varying the rapidity of drying of the crystal lacquer, the size of the crystals formed may be correspondingly varied. For example, by retarding the drying, the size of the crystals will be increased and vice versa. Since the crystal lacquer is transparent and is supplied to the base 1 having uniform color, the crystal formations are not well defined as shown by the layer 2 in the drawing. The crystal lacquer layer 2 dries in about an hour or two in the open air.

The crystal lacquer layer 2 when dried, is rubbed or smutted with a pigment or metallic powder, or a combination of the two, the said pigment or powder being ground in a suitable vehicle, such as japan (clear varnish), glue size, water soluble gum and other clear vehicles containing no nitrocellulose solvents, thereby producing the surface indicated by the reference numeral 3 in the drawing. It will be noted that this smutting brings out the crystalline outline and clearly defines the borders of the crystals. The pigment or metallic powder may be of any color desired, and of similar or contrasting shades with respect to the color combination of the priming coat. Nitrocellulose solvents cannot be used as the vehicle of the pigment used in the smutting operation because to do so would cause a partial or complete dissolving of the cellulose crystal lacquer surface 2.

One or more coats of clear or translucent cellulose lacquer is now applied upon the smutted surface 3, producing the finished composition surface 4. The coat or coats of cellulose lacquer dissolves off the higher portions of the crystal structure of layer 3 and fills up the fissures of this layer, but does not effect the crystalline outlines brought out by the smutting operation. This cellulose lacquer by so dissolving off the higher or raised portions of the crystals and filling interstices causes the entire surface to become smooth, and even, so that the finished composition has a smooth glass-like surface. This surface, if desired, may be given a very high lustrous finish by rubbing or buffing the same. The cellulose lacquer used in producing layer 4 will be of a type commonly used for the material upon which the novel coating composition of this invention is applied. For example, if the coating composition is applied to wood, the clear or translucent cellulose lacquer forming layer 4 would be of a type, such as would ordinarily be used on wood. Likewise when the novel coating composition is applied to metal or leather, cellulose lacquers or dopes commonly used on these surfaces would be applied.

The novel coating composition of this invention as thus applied to the surface, presents a beautiful and attractive appearance, as indicated by viewing layer 4 in the drawing. The said coating may have any desired color combinations and any desired crystal formations or size of crystals. The drawing illustrates, by way of example, crystals of the monoclinic system, but it is to be understood that any crystalline system may be obtained by using a suitable crystal substance in the crystal lacquer and by the proper combination of solvents, as is known to those skilled in the art. Although preferably cellulose acetate lacquer is used as a priming coat, it is merely necessary that a primer be used which will not be dissolved by the crystal lacquer applied thereto. Thus a baked resin may be employed as the priming coat. Also a baked oil base may be used, or baked japan or a number of substances may be used in lieu of the cellulose acetate lacquer and still obtain the desired results of the novel composition of this invention.

What is claimed is:—

1. The process of producing a surface coating comprising the application of a layer of crystal lacquer to a base, applying coloring material to the crystal lacquer surface to give definition to the crystal formation thereof, and then applying a layer of cellulose lacquer to the thus treated surface to dissolve off the higher parts of the crystal lacquer surface and to fill up the fissures thereof, thereby producing a smooth and lustrous exterior surface.

2. The process of producing a surface coating having a plurality of superimposed layers comprising the application of a layer of crystal lacquer to a base, rubbing the crystal lacquer layer with a coloring material, and subsequently applying a layer of cellulose lacquer upon the rubbed surface, the said cellulose lacquer acting to dissolve off the higher parts of the crystal lacquer layer and to fill up the fissures between the crystals, thereby producing, upon drying, a smooth exterior surface.

3. The process of producing a crystal coating composition having a plurality of superimposed layers, the steps which comprise the application of a layer of crystal lacquer to a base, rubbing the crystal lacquer when dried with a coloring material dispersed in a vehicle, and subsequently applying a layer of cellulose lacquer upon the rubbed surface, the said cellulose lacquer acting to dissolve off the higher parts of the crystal lacquer layer and to fill up the fissures between the crystals, thereby producing, upon drying, a crystal coating composition with a smooth exterior surface.

4. The process of producing a surface coating comprising initially applying a priming coat to the surface to be coated, then applying a layer of clear crystal lacquer to the priming coat, applying coloring material to the crystal lacquer surface to give definition to the crystal formation thereof, and then applying cellulose lacquer to the thus treated surface to dissolve off the higher parts of the crystal lacquer surface and to fill up the fissures thereof, thereby producing a smooth exterior surface.

5. The process of producing a surface coating comprising initially applying a priming coat of cellulose acetate lacquer to the surface to be coated, then applying a layer of clear crystal lacquer to the priming coat, smutting the crystal lacquer surface with a coloring material to give definition to the crystal formation thereof, and then applying cellulose lacquer to the thus treated crystal lacquer surface to dissolve off the higher parts of the crystals and to fill the interstices, thereby producing a smooth exterior coating surface.

6. An object comprising a supporting base, a layer of crystal lacquer adhered to said base and having its crystal formations treated with a coloring material to give definition to the crystals thereof, in combination with an overlying application of cellulose lacquer, whereby the higher parts of the crystal lacquer layer are dissolved away and leveled so that the exposed surface of the coating composition is uniformly smooth.

7. An object comprising a base, priming material on said base, a layer of crystal lacquer on said priming material, said layer of crystal lacquer having its crystal formation treated with coloring material to give definition to the crystals thereof, in combination with an overlying application of cellulose lacquer, whereby the higher parts of the crystal lacquer layer are dissolved away and leveled so that the exposed surface of the coating composition is uniformly smooth.

In testimony that I claim the invention set forth above I have hereunto set my hand this 13th day of May, 1930.

GUSTAVE KLINKENSTEIN.